(12) United States Patent
Mandloi

(10) Patent No.: US 11,580,543 B2
(45) Date of Patent: Feb. 14, 2023

(54) METHODS, SYSTEMS AND COMPUTER PROGRAM PRODUCTS FOR IMPLEMENTING PRE-AUTHORIZED PAYMENT TRANSACTIONS

(71) Applicant: MASTERCARD INTERNATIONAL INCORPORATED, Purchase, NY (US)

(72) Inventor: Abhay Mandloi, Madhya Pradesh (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 75 days.

(21) Appl. No.: 16/699,522

(22) Filed: Nov. 29, 2019

(65) Prior Publication Data
US 2020/0219103 A1 Jul. 9, 2020

(30) Foreign Application Priority Data
Jan. 3, 2019 (IN) .............................. 201911000338

(51) Int. Cl.
*G06Q 20/40* (2012.01)
*G06Q 20/20* (2012.01)
(52) U.S. Cl.
CPC ....... *G06Q 20/4012* (2013.01); *G06Q 20/206* (2013.01)
(58) Field of Classification Search
None
See application file for complete search history.

(56) References Cited

U.S. PATENT DOCUMENTS

| | | | |
|---|---|---|---|
| 6,052,675 A | 4/2000 | Checchio | |
| 8,842,887 B2 * | 9/2014 | Beatson | H04L 9/3231 382/115 |
| 2004/0128243 A1 * | 7/2004 | Kavanagh | G06Q 20/403 705/39 |

(Continued)

FOREIGN PATENT DOCUMENTS

WO  WO-2014032206 A1 *  3/2014  ............. G06Q 20/20

OTHER PUBLICATIONS

Kumar, P., "Examination Report", corresponding to Indian Application No. 201911000338, dated Dec. 30, 2020, 7 pages.

*Primary Examiner* — Paul S Schwarzenberg

(57) ABSTRACT

The invention provides methods, systems and computer program products for implementing pre-authorized payment transactions. In an embodiment, the invention comprises at a point-of-sale (POS) terminal (i) receiving a payment initiation request, (ii) receiving payment account information associated with a payment account associated with a payor, and (iii) receiving a first input identifying the payment transaction as a payment transaction that has been pre-authorized, (iv) responsive to receiving the first input identifying the payment transaction as a payment transaction that has been pre-authorized, generating a transaction payment request based on a pre-defined request message format, wherein a personal identification number (PIN) data element within the transaction payment request is populated independent of any PIN value input at the POS terminal, and (v) routing the generated transaction payment request to a transaction authorization server that is communicably coupled to the pre-authorized transaction database.

20 Claims, 15 Drawing Sheets

(56) References Cited

U.S. PATENT DOCUMENTS

| | | | |
|---|---|---|---|
| 2008/0222049 A1 | 9/2008 | Loomis et al. | |
| 2012/0095852 A1* | 4/2012 | Bauer | G06Q 20/3227 |
| | | | 705/16 |
| 2012/0303531 A1* | 11/2012 | Betancourt | G06Q 20/3278 |
| | | | 705/44 |
| 2014/0025576 A1 | 1/2014 | Esch | |
| 2017/0091770 A1* | 3/2017 | Bacastow | G06Q 20/322 |
| 2018/0357637 A1 | 12/2018 | Radu | |
| 2018/0374083 A1 | 12/2018 | Krishnaiah et al. | |

\* cited by examiner

| Pre-authorization ID | Payor ID | Payment Instrument Information | Transaction Information | Merchant Information | Pre-authorization Type |
|---|---|---|---|---|---|
| | | | | | |
| | | | | | |
| | | | | | |

Figure 6

METHODS, SYSTEMS AND COMPUTER PROGRAM PRODUCTS FOR IMPLEMENTING PRE-AUTHORIZED PAYMENT TRANSACTIONS

CROSS REFERENCE TO RELATED APPLICATIONS

This application claims priority to Indian Patent Application No. 201911000338, filed Jan. 3, 2019, entitled "Methods, Systems and Computer Program Products for Implementing Pre-Authorized Payment Transactions", the entirety of which is incorporated by reference.

FIELD OF THE INVENTION

The present invention relates to the domain of electronic payment transactions, and more particularly to methods, systems and computer program products for implementing pre-authorized payment transactions.

BACKGROUND OF THE INVENTION

Electronic payment transactions involving payments from payors to merchants, retailers or service providers for goods or services received are increasingly common. A popular type of electronic payment transaction involves initiating payment based on a token that identifies the source of funding (i.e. the payor's payment instrument and other payment details)—and inputting the transaction amount and payor authentication information (for example a personal identification number, or password) at a point-of-sale (POS) terminal. The transaction amount and payor authentication information is electronically forwarded to an issuer associated with the payor's payment account (for example through a centralized payment network)—whereafter the issuer decides whether to authorize the transaction based on a determination that the transaction amount is less than with an available balance associated with the payor's payment account, and based on authentication of the payor's identity using the received authentication information.

It has been found that the process steps involving input of authentication information and/or transaction amount information at the POS terminal is generally considered inconvenient and interferes with the overall payment experience. Additionally, the time involved in transaction authorization at the issuer backend is a further inconvenience which payors are faced with from time to time.

There is accordingly a need for a solution that enables pre-authorization of payment transactions in a manner that improves the user experience.

SUMMARY

The invention provides methods, systems and computer program products for implementing pre-authorized payment transactions.

In one embodiment, the invention comprises a method for implementing a payment transaction that has been pre-authorized, wherein said pre-authorization includes storing a data record comprising transaction parameters corresponding to said payment transaction in a pre-authorized transaction database. The method comprises at a point-of-sale (POS) terminal (i) receiving a payment initiation request, (ii) receiving payment account information associated with a payment account associated with a payor, and (iii) receiving a first input identifying the payment transaction as a payment transaction that has been pre-authorized, (iv) responsive to receiving the first input identifying the payment transaction as a payment transaction that has been pre-authorized, generating a transaction payment request based on a pre-defined request message format, wherein a personal identification number (PIN) data element within the transaction payment request is populated independent of any PIN value input at the POS terminal, and (v) routing the generated transaction payment request to a transaction authorization server that is communicably coupled to the pre-authorized transaction database.

In a method embodiment, the POS terminal receives a second input identifying the payment transaction as a payment transaction that has been pre-authorized for an exact transaction value. Responsive to receiving the second input identifying the payment transaction as a payment transaction that has been pre-authorized for an exact transaction value, the method includes generating the transaction payment request based on the pre-defined request message format, wherein a transaction amount data element within the transaction payment request is populated independent of any transaction amount value input at the POS terminal.

In a method embodiment, (i) the POS terminal receives a second input identifying the payment transaction as a payment transaction that has been pre-authorized for any transaction value that is less than or equal to a specified transaction value and (ii) responsive to receiving the second input identifying the payment transaction as a payment transaction that has been pre-authorized for any transaction value that is less than or equal to a specified transaction value, the transaction payment request is generated based on the pre-defined request message format, wherein a transaction amount data element within the transaction payment request is populated with a transaction amount value received through a third input at the POS terminal.

In a specific method embodiment, the payment transaction is pre-authorized by a pre-authorization server based on at least payor information, payment account information and transaction value information submitted to the pre-authorization server from a client terminal in advance of receiving the payment initiation request at the POS terminal.

Either or both of the pre-authorization server and the authorization server may be located within a payment network or an issuer network associated with the payment account. In an embodiment of the method, the pre-authorization server and the authorization server are both the same server.

In a particular embodiment, the method includes implementing at the transaction authorization server, the steps of (i) extracting transaction parameters from the generated transaction payment request, (ii) comparing the extracted transaction parameters against pre-authorized transaction records retrieved from the pre-authorized transaction database, and (iii) responsive to determining that the extracted transaction parameters match a retrieved pre-authorized transaction record, initiating the requested transaction payment based on the extracted transaction parameters.

The requested transaction payment may be initiated by the transaction authorization server without relying on a data value within the PIN data element of the transaction payment request received from the POS terminal.

In a method embodiment, responsive to the extracted transaction parameters matching a pre-authorized transaction record having a pre-authorization type data field that reflects the pre-authorized transaction as a pre-authorization of an exact transaction amount, the requested transaction payment is initiated by the transaction authorization server without relying on either of (i) a data value within the PIN data element of the transaction payment request received from the POS terminal, and (ii) a data value within the transaction amount data value of the transaction payment request received from the POS terminal.

In one method embodiment, wherein responsive to the extracted transaction parameters matching a pre-authorized transaction record having a pre-authorization type data field that reflects the pre-authorized transaction as a pre-authorization for any transaction amount less than or equal to a transaction value recorded within the matching pre-authorized transaction record, the requested transaction payment is initiated by the transaction authorization server without relying on a data value within the PIN data element of the transaction payment request received from the POS terminal, and by relying on a data value within the transaction amount data value of the transaction payment request received from the POS terminal.

The invention includes A system for implementing a payment transaction that has been pre-authorized and wherein said pre-authorization includes storing a data record comprising transaction parameters corresponding to said payment transaction in a pre-authorized transaction database. The system may comprise a processor implemented point-of-sale (POS) terminal, configured to implement the steps of (i) receiving a payment initiation request, (ii) receiving payment account information associated with a payment account associated with a payor, (iii) receiving a first input identifying the payment transaction as a payment transaction that has been pre-authorized, (iv) responsive to receiving the first input identifying the payment transaction as a payment transaction that has been pre-authorized, generating a transaction payment request based on a pre-defined request message format, wherein a personal identification number (PIN) data element within the transaction payment request is populated independent of any PIN value input at the POS terminal, and (v) routing the generated transaction payment request to a transaction authorization server that is communicably coupled to the pre-authorized transaction database.

In a system embodiment, the POS terminal is configured to (i) receive a second input identifying the payment transaction as a payment transaction that has been pre-authorized for an exact transaction value, and (ii) responsive to receiving the second input identifying the payment transaction as a payment transaction that has been pre-authorized for an exact transaction value, generate the transaction payment request based on the pre-defined request message format, wherein a transaction amount data element within the transaction payment request is populated independent of any transaction amount value input at the POS terminal.

In a further system embodiment, the POS terminal is configured to (i) receive a second input identifying the payment transaction as a payment transaction that has been pre-authorized for any transaction value that is less than or equal to a specified transaction value, and (ii) responsive to receiving the second input identifying the payment transaction as a payment transaction that has been pre-authorized for any transaction value that is less than or equal to a specified transaction value, generate the transaction payment request based on the pre-defined request message format, wherein a transaction amount data element within the transaction payment request is populated with a transaction amount value received through a third input at the POS terminal.

The system may be configured such that the payment transaction has been pre-authorized by a pre-authorization server based on at least payor information, payment account information and transaction value information submitted to the pre-authorization server from a client terminal in advance of receiving the payment initiation request at the POS terminal.

In an embodiment of the system either or both of the pre-authorization server and the authorization server are located within a payment network or an issuer network associated with the payment account.

In another embodiment, the pre-authorization server and the authorization server are both the same server.

The system may include a transaction authorization server configured to (i) extract transaction parameters from the generated transaction payment request, (ii) compare the extracted transaction parameters against pre-authorized transaction records retrieved from the pre-authorized transaction database, and (iii) responsive to determining that the extracted transaction parameters match a retrieved pre-authorized transaction record, initiate the requested transaction payment based on the extracted transaction parameters.

The transaction authorization server may be configured to initiate the requested transaction payment without relying on a data value within the PIN data element of the transaction payment request received from the POS terminal.

The transaction authorization server may be configured such that responsive to the extracted transaction parameters matching a pre-authorized transaction record having a pre-authorization type data field that reflects the pre-authorized transaction as a pre-authorization of an exact transaction amount, the requested transaction payment is initiated by the transaction authorization server without relying on either of (i) a data value within the PIN data element of the transaction payment request received from the POS terminal, and (ii) a data value within the transaction amount data value of the transaction payment request received from the POS terminal.

In a system embodiment, the transaction authorization server is configured such that responsive to the extracted transaction parameters matching a pre-authorized transaction record having a pre-authorization type data field that reflects the pre-authorized transaction as a pre-authorization for any transaction amount less than or equal to a transaction value recorded within the matching pre-authorized transaction record, the requested transaction payment is initiated by the transaction authorization server without relying on a data value within the PIN data element of the transaction payment request received from the POS terminal, and by relying on a data value within the transaction amount data value of the transaction payment request received from the POS terminal.

The invention additionally provides computer program products implementing pre-authorized payment transactions, comprising a non-transitory computer usable medium having computer readable program code embodied therein, the computer readable program code comprising instructions for implementing any of the method embodiments described in the disclosure herein.

BRIEF DESCRIPTION OF THE ACCOMPANYING DRAWINGS

FIG. 6 illustrates an exemplary data structure for data records generated by a pre-authorization server in connection with pre-authorized payment transactions.

DETAILED DESCRIPTION

The invention provides methods, systems and computer program products for implementing pre-authorized payment transactions.

For the purposes of the present invention, the following terms shall be understood to have the corresponding meanings provided below:

"Acquirer" shall mean a business (e.g., a financial institution or a merchant bank) that contracts with a merchant to coordinate with the issuer network of a customers' payment card.

"Acquirer network" shall refer to a communication network, including hardware, software and other equipment used by an acquirer to transmit and process card based transactions and information related to merchants, customers, payment cards and transactions.

"Payor", "Card holder" or "Customer" shall mean an authorized payment card user who is making a purchase or effecting an electronic transaction with a payment card.

"Payment network" shall refer to the intermediary between the merchant's acquirer and the customer's issuer (for example, Mastercard® or Visa®). The payment network primarily coordinates payment card transactions between acquirers and issuers, and additionally coordinates clearing and settlement services to transfer payments from issuers to merchants.

"Issuer" shall mean a financial institution that issues payment cards and maintains a contract with a customer or card holder for repayment or settlement of purchases made on the payment card.

"Issuer network" shall refer to a communication network, including hardware, software and other equipment used by an issuer to transmit and process payment card transactions and information related to customers, payment cards and transactions.

"Merchant" or "Payee" shall mean an authorized acceptor of payment cards for the payment of goods or services sold by the merchant.

"Payment card" shall mean a card or data associated with a payment account that may be provided to a merchant in order to fund a financial transaction via the associated payment account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated payment account (e.g., as stored in a communication device, such as a smart phone or computer). For example, in some instances, data including a payment account number may be considered a payment card for the processing of a transaction funded by the associated payment account. In some instances, a check may be considered a payment card where applicable.

"Payment account" shall mean any account that may be used for the purposes of effecting an electronic payment or electronic transaction, and shall include any electronic transaction account, payment card account, bank account or electronic wallet account.

Figure 1:
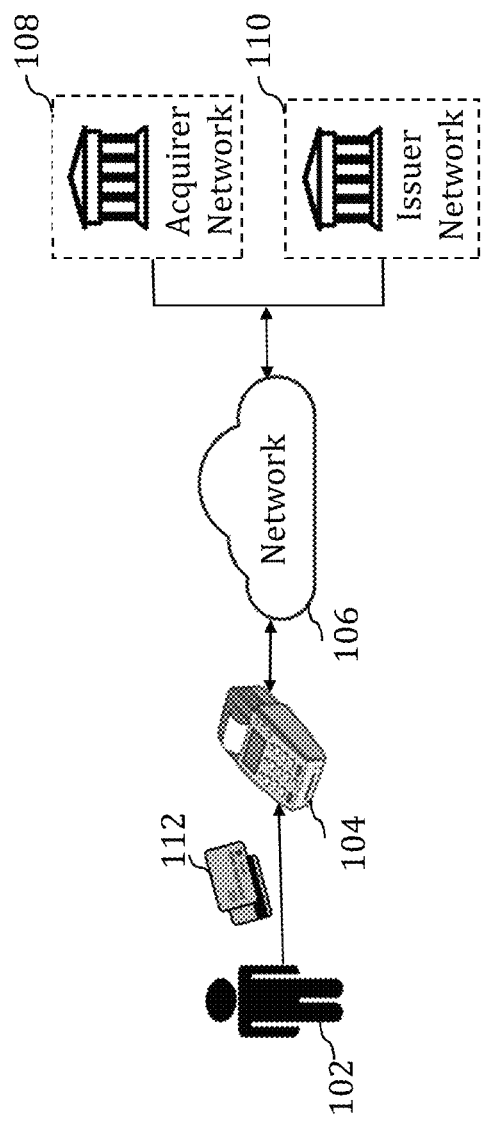
FIG. 1 illustrates a prior art system environment for implementing electronic payment transactions through a POS terminal.

FIG. 1 illustrates a prior art system environment 100 for implementing electronic payment transactions. System environment 100 comprises a payor 102 having a payment card 112 (for example a credit card or debit card). Payor 102 may initiate payment transactions using payment card 112 through a POS terminal 104—for example by swiping a credit card (the payment card) at a credit card machine (the POS terminal). POS terminal 104 is communicably coupled to network 106 (which network may comprise a payment network or a data network) and through network 106 to acquirer network 108. Network 106 is also communicably coupled to issuer network 110.

Figure 2:
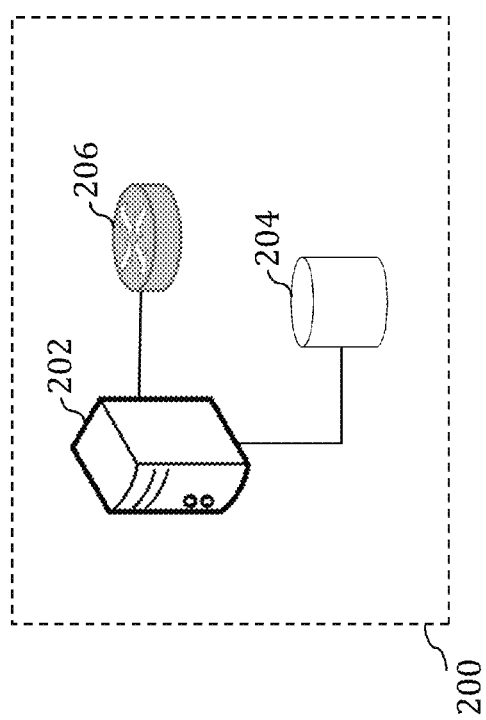
FIG. 2 illustrates an exemplary system configuration of a type that may be implemented for the purposes of an acquirer network or an issuer network.

One or both of acquirer network 108 and issuer network 110 may in certain embodiments be configured according to the exemplary network 200 illustrated in FIG. 2—comprising a network server 202, network database 204 and interface gateway 206.

In a specific embodiment wherein network 200 is implemented within acquirer network 108, network server 202 may be configured to receive and process information relating to payment card transactions. In an embodiment, the network server 202 may receive or process transactions received only from merchants having a merchant account with the acquirer—which determination may be made based on information retrieved from the acquirer network database 204. In such embodiments interface gateway 206 may include a hardware or software network gateway configured to enable the acquirer network 108 to communicate with network 106.

In an embodiment where network 200 is implemented within issuer network 110, network server 202 may be configured to receive and process information relating to payment card transactions. In an embodiment, the network server 202 may only receive or process transactions related to payee accounts that are maintained with the issuer— which determination may be made based on information retrieved from issuer network database 204. Interface gateway 206 may include a hardware or software network gateway configured to enable issuer network 110 to communicate with network 106.

Figure 3:
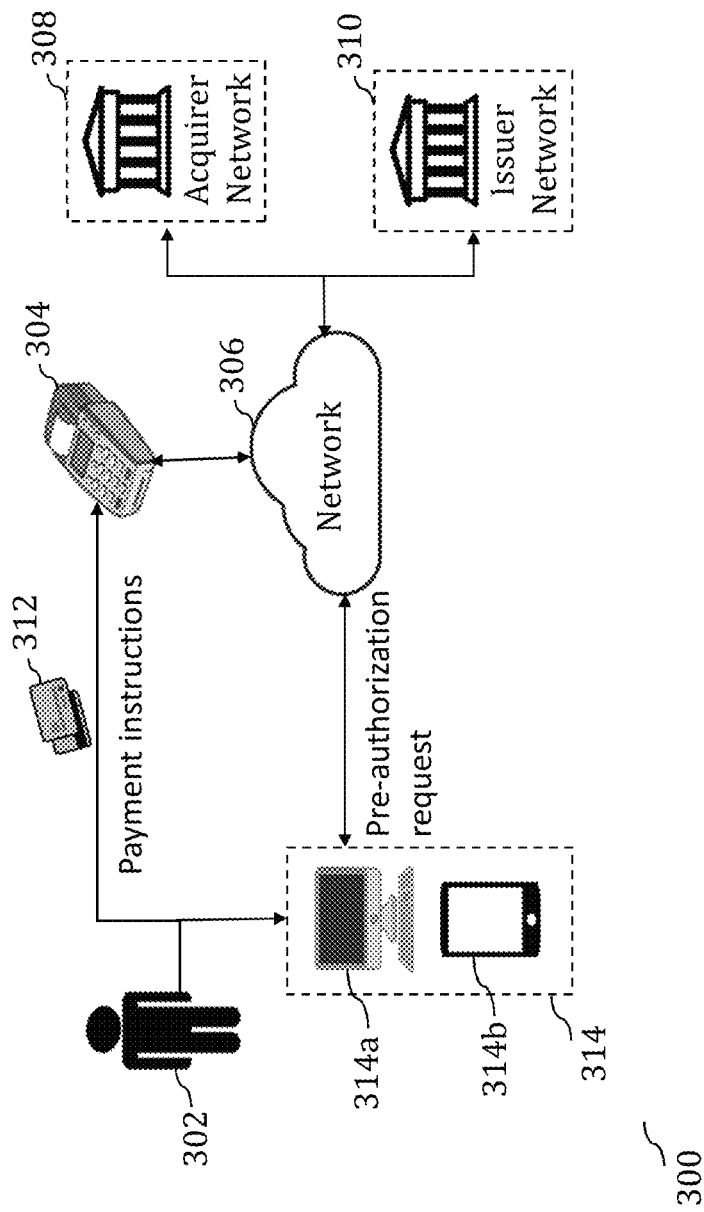
FIG. 3 illustrates a system environment for implementing pre-authorized electronic payment transactions through a POS terminal.

FIG. 3 illustrates a system environment 300 for implementing pre-authorized electronic payment transactions through a POS terminal in accordance with the teachings of the present invention.

System environment 300 includes payor 302 having a payment card 312. Payor 302 may have access to a client terminal 314 through which payor 302 may pre-authorize one or more payment transactions that the payor intends to make. Client terminal 314 may comprise any processor implemented data processing device having network communication capabilities, and may in certain embodiments comprise a computing device 314a or a smartphone 314b or other network communication enabled mobile device. Client terminal 314a be communicably coupled through network 306 with an authorization server (not shown in FIG. 3), which authorization server may be configured to receive payment pre-authorization requests from client terminal 314a, and to pre-authorize one or more payment transactions. The authorization server may be located within network 306 (which may in certain embodiments comprise a payment network associated with a client's payment card) or may be located within issuer network 310. Once a payment transaction has been pre-authorized, payor 302 may provide payment instructions/initiate a pre-authorized payment transaction using payment card 312 through POS terminal 304—for example by swiping payment card 312 at POS terminal 304. POS terminal 304 is communicably coupled to network 306, and through network 306 to acquirer network 308 and to issuer network 310. Specific implementations of the manner in which payment transactions are pre-authorized and pre-authorized transactions are initiated and concluded within system environment 300, are discussed in connection with FIGS. 4 to 15 below.

Figure 4:
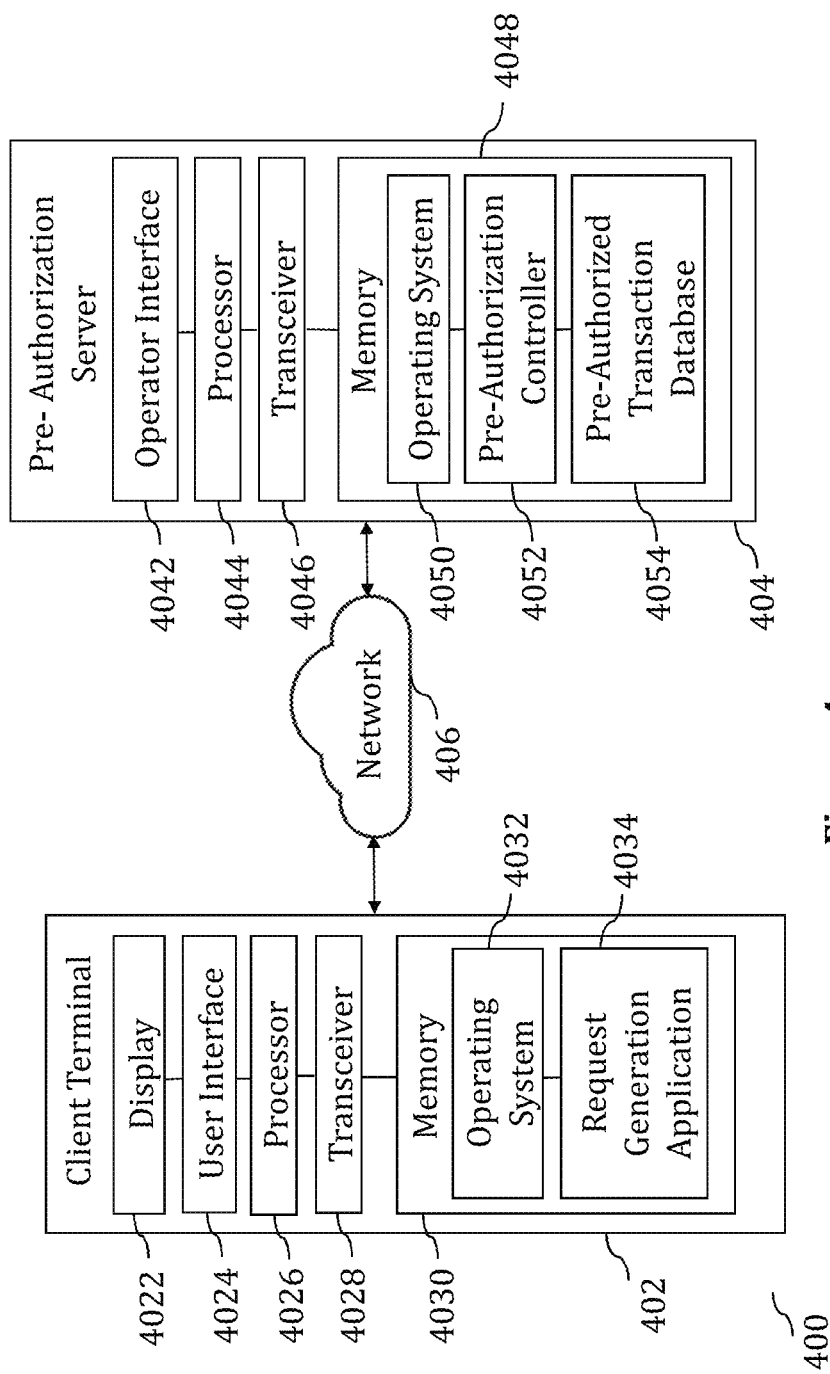
FIG. 4 illustrates the interaction of specific system entities within the system environment of FIG. 3 for the purpose of implementing pre-authorized electronic payment transactions in accordance with the present invention.

FIG. 4 illustrates an embodiment of a client terminal 402 and a pre-authorization server 404 that interface for the purposes of payment transaction pre-authorization within system environment 300. Client terminal 402 and pre-authorization server 404 are communicably coupled through network 406—which may comprise a communication network, data network or a payment network associated with a payment card that a payor intends to use for the payment transaction that is being pre-authorized.

Client terminal 402 may comprise any communication terminal configured for network based communication. In specific embodiments, client terminal 402 may comprise a mobile communication device or a smartphone. Said client terminal 402 may include a display 4022, a user interface 4024, processor 4026, communication transceiver 4028 and memory 4030, which memory 4030 may include transitory memory and/or non-transitory memory. In an exemplary embodiment, memory 4030 may have stored therewithin, (i) an operating system 4032 configured for managing device hardware and software resources and that provides common services for software programs implemented within client terminal 402, and (ii) a request generation application (which may include a wallet application or a software payment application, or a web browser application or any other software application) 4034 configured to enable payment transaction pre-authorization requests to be generated from client terminal 402.

Pre-authorization server 404 may comprise any processor implemented server device or data processing device configured for network based communication. In specific embodiments, pre-authorization server 404 may include an operator interface 4042, a processor 4044, communication transceiver 4046 and memory 4048, which memory 4048 may include transitory memory and/or non-transitory memory. In an exemplary embodiment, memory 4048 may have stored therewithin, (i) an operating system 4050 configured for managing device hardware and software resources and that provides common services for software programs implemented within pre-authorization server 404, and (ii) a pre-authorization controller 4052 configured to receive requests for payment transaction pre-authorization from one or more client terminals 402 and to either pre-authorize a requested payment transactions or refuse to authorized a requested payment transaction pre-authorization, based on one or more pre-authorization rules.

Memory 4048 may additionally include a pre-authorized transaction database 4054 that is used to store information corresponding to one or more payment transactions that have been successfully pre-authorized by pre-authorization server 404—which information may subsequently be retrieved and/or used in response to initiation of a pre-authorized payment transaction at a POS terminal. In certain embodiments, pre-authorized transaction database 4054 may additionally include information regarding payment transaction pre-authorizations that have been refused, and/or one or more payment transaction pre-authorization rules, based on which pre-authorization controller 4052 can determine whether a transaction pre-authorization request should be approved or refused.

In various embodiments, pre-authorization server 404 may be located within an issuer network associated with the payor, or within a payment network associated with a payment card associated with the payor.

Figure 5:
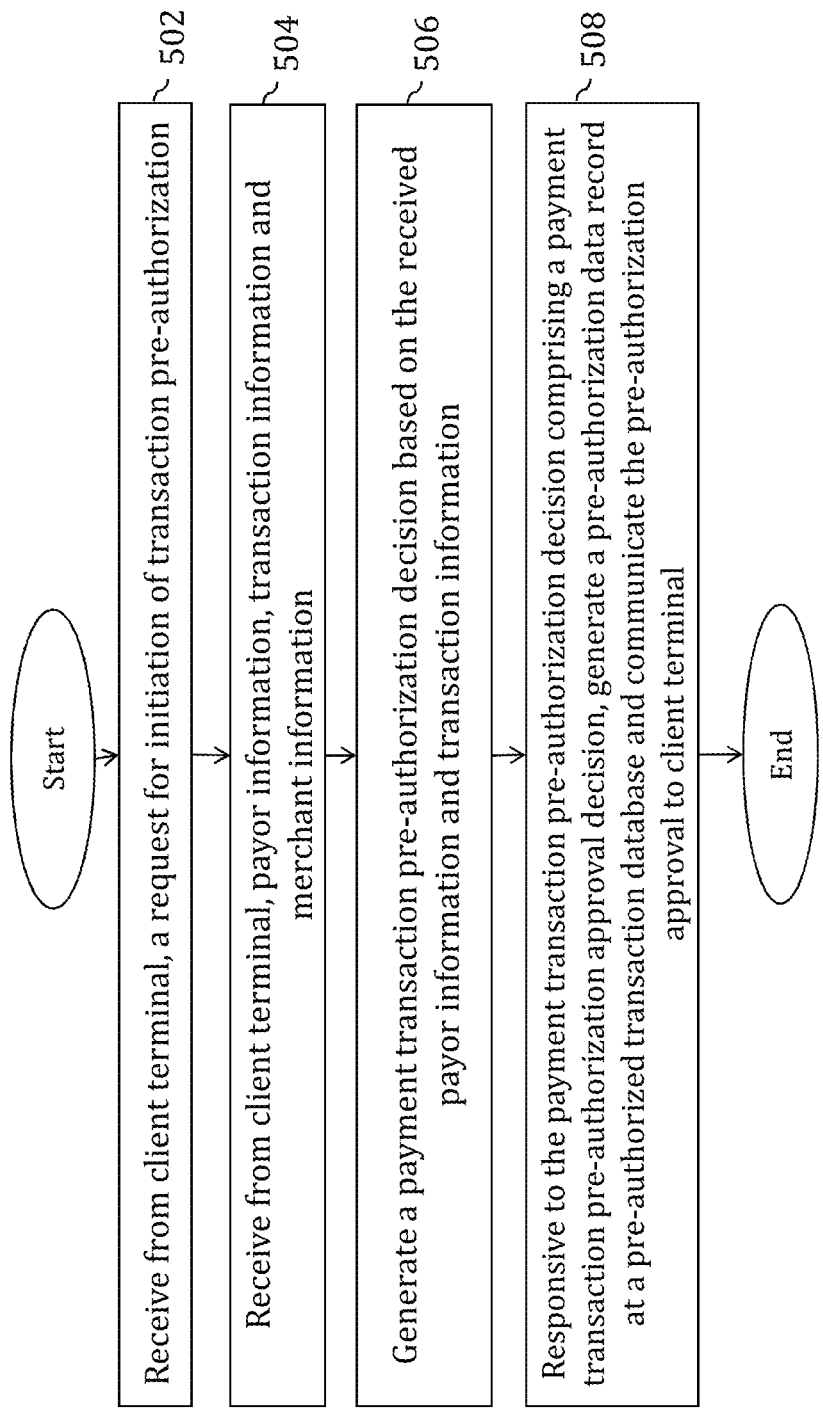
FIG. 5 illustrates a method for pre-authorizing a proposed payment transaction.

FIG. 5 illustrates a method for pre-authorizing a proposed payment transaction in accordance with the present invention, involving the system entities illustrated in FIG. 4.

At step 502, pre-authorization server 404 receives from client terminal 402, a request for initiation of transaction pre-authorization. The request for initiation of transaction pre-authorization may be generated by request generation application 4034 within client terminal 402 and may be transmitted to pre-authorization server 404 through network 406.

At step 504, pre-authorization server 404 receives from client terminal 402, payor information, merchant information and transaction information associated with the payment transaction sought to be pre-authorized. Received payor information may include one or more of payor name, a payor identifier, a payor address, payment card information (e.g. payment card number, CVV number and/or expiry date) and payor authorization information (e.g. a PIN, password or OTP associated with the payor). Received merchant information may include one or more of a merchant name, a merchant identifier, a merchant type, type of goods or services associated with the merchant, and merchant location. Received transaction information may include information defining or describing the payment transaction sought to be pre-authorized, which may include the exact transaction value or maximum permissible transaction value, and a description of a time window within which the payment transaction is expected to be initiated.

At step 506, pre-authorization server 506 generates a payment transaction pre-authorization decision based on the received payor information and transaction information. The payment transaction pre-authorization decision may be generated based (i) on one or more payment transaction pre-authorization rules, which may be stored in or retrieved from memory 4048 and (ii) one or more of the received payor information, received merchant information and received transaction information. The payment transaction pre-authorization decision may comprise a payment transaction pre-authorization approval decision or a payment transaction pre-authorization rejection decision.

At step 508, responsive to the payment transaction pre-authorization decision comprising a payment transaction pre-authorization approval decision, pre-authorization server 404 generates a pre-authorization data record corresponding to the pre-authorized payment transaction—which data record is stored within pre-authorized transaction database 4054 (and is discussed in more detail in connection with FIG. 6). The payment transaction pre-authorization approval decision is thereafter communicated from pre-authorization server 404 to client terminal 402 through network 406—so that the payor knows that the requested payment transaction has been pre-authorized.

FIG. 6 illustrates an exemplary data structure 600 for data records maintained by a pre-authorization server in connection with pre-authorized payment transactions.

Each data record within data structure 600 comprises a plurality of data fields including (i) a pre-authorization ID data field 602 configured to record a unique identifier allocated by pre-authorization server 404 to a payment transaction that has been pre-authorized, (ii) a payor ID data field 604 configured to record a unique identified associated with a payor associated with a payment transaction that has been pre-authorized, (iii) a payment instrument information data field 606 configured to record information corresponding to a payment instrument (e.g. payment card number, CVV number and/or expiry date) that a payor has identified as being intended to be used for a payment transaction that has been pre-authorized, (iv) a transaction information data field 608 configured to record information defining or describing a payment transaction that has been pre-authorized (e.g. the exact transaction value or maximum permissible transaction value, a description of a time window within which the payment transaction is expected to be initiated), (v) a merchant information data field 610 configured to record information defining or describing a merchant intended to be involved in a payment transaction that has been pre-authorized (e.g. merchant name, merchant identifier, merchant type, type of goods or services associated with the merchant, and merchant location), and (vi) a pre-authorization type data field 612—configured to record information that identifies a recorded transaction pre-authorization as being pre-authorized for an exact transaction amount or for any transaction amount less than or equal to a maximum permissible transaction value.

Figure 7:
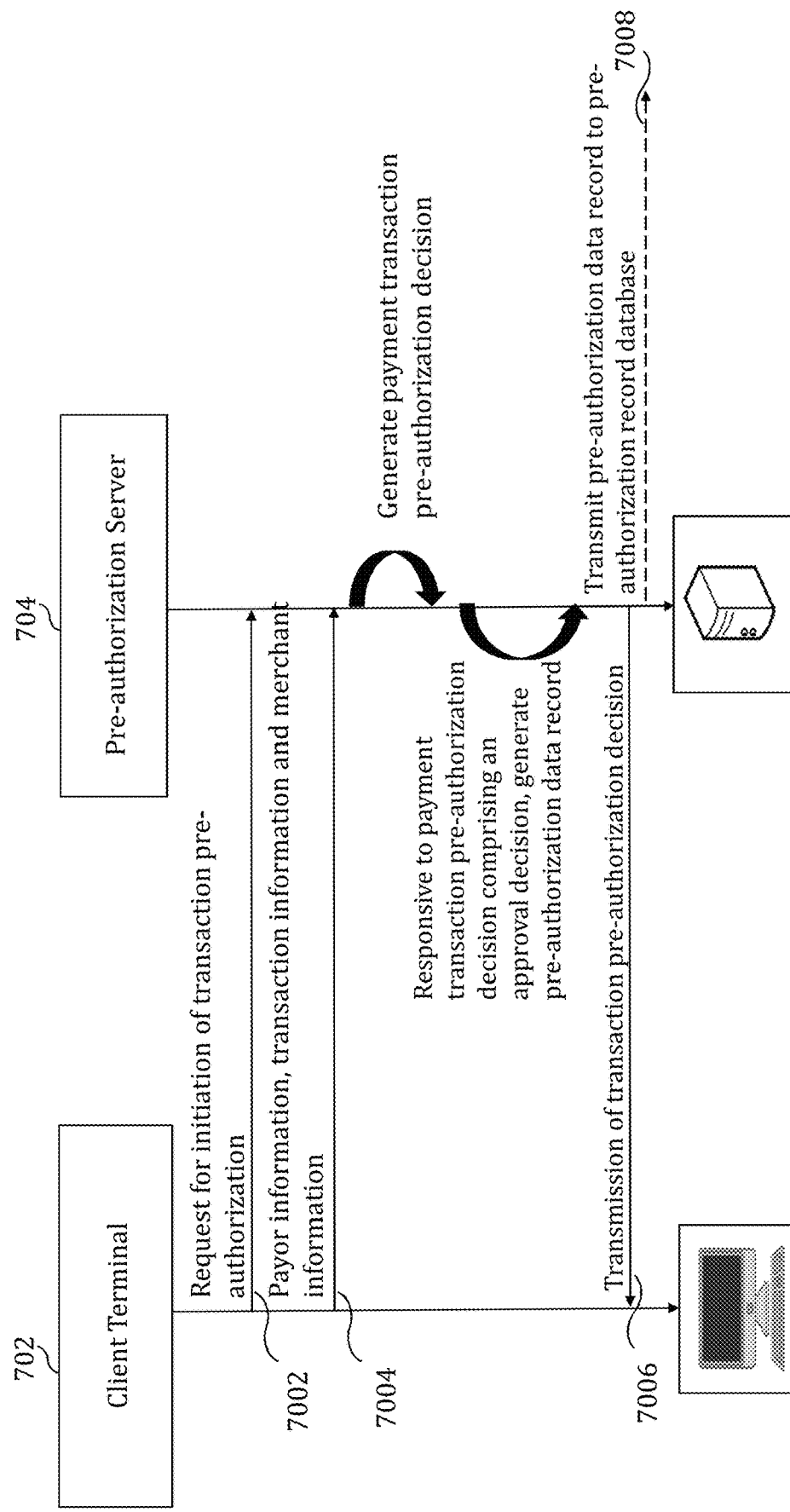
FIG. 7 is a communication flow diagram illustrating communication flow between system entities involved in pre-authorizing a proposed payment transaction.

FIG. 7 is a communication flow diagram illustrating communication flow between system entities involved in pre-authorizing a proposed payment transaction in accordance with the method described above in connection with FIG. 5.

At step 7002, client terminal 702 transmits a request for initiation of transaction pre-authorization to pre-authorization server 704. Step 7004 thereafter comprises transmitting payor information, transaction information and merchant information from client terminal 702 to pre-authorization server 704.

Based on the information received at step 7004 and on one or more pre-authorization rules, pre-authorization server 704 generates a payment transaction pre-authorization decision, and responsive to said decision comprising an approval decision, generates and stores a pre-authorization data record corresponding to the pre-authorized transaction (for example a data record based on the data structure 600 described in connection with FIG. 6). At step 7006, the transaction pre-authorization decision generated by pre-authorization server 704 is thereafter transmitted to client terminal 702 to inform the payor of the outcome of the pre-authorization request initiated at step 7002. Step 7008 additionally comprises transmitting the pre-authorization data record corresponding to the pre-authorized transaction to a database of pre-authorized transactions for storage and/or subsequent retrieval.

Figure 8:
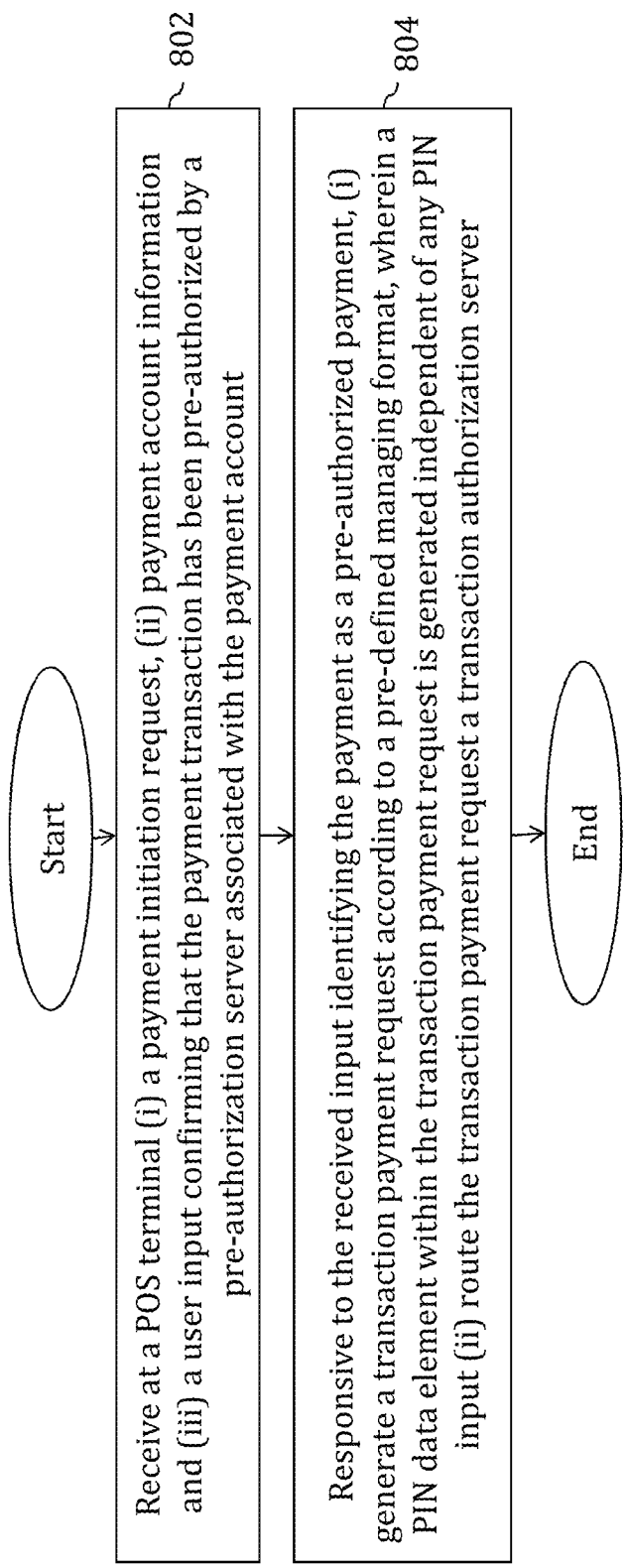
FIG. 8 illustrates a first embodiment of a method of initiating at a POS terminal, a payment transaction that has been pre-authorized.

FIG. 8 illustrates a first embodiment of a method of initiating at a POS terminal, a payment transaction that has been pre-authorized. In the illustrated method embodiment, step 802 comprises receiving at a POS terminal (i) a payment initiation request, (ii) payment account information associated with a payment account presented by a payor for the purpose of executing the pre-authorized transaction and (iii) a user input confirming that the payment transaction has been pre-authorized by a pre-authorization server associated with the payment account (for example by a pre-authorization server associated with a payment network or with an issuer network associated with the payment account).

At step 804, responsive to an input received at the POS terminal identifying the payment transaction as a payment transaction that has been pre-authorized by a pre-authorization server associated with the pre-authorized payment, the POS terminal (i) generates a transaction payment request according to a pre-defined request message format, wherein a personal identification number (PIN) data element within the transaction payment request is populated with data that is independent of any PIN input by the user (for example, comprising a random value or a dummy value) and (ii) routes the transaction payment request including the populated PIN data element to a transaction authorization server for transaction authorization. In an embodiment, the transaction authorization server of FIG. 8 may be the same server as the pre-authorization server that has previously pre-authorized the payment. In another embodiment, the transaction authorization server of FIG. 8 may be distinct from the pre-authorization server that has previously pre-authorized the payment, and may be in network communication with said pre-authorization server.

By implementing the method of FIG. 8, it will be noted that a user requesting initiation of the pre-authorized payment transaction need not enter her/his PIN for transaction authorization, which results in a faster and more convenient transaction authorization process.

Figure 9:
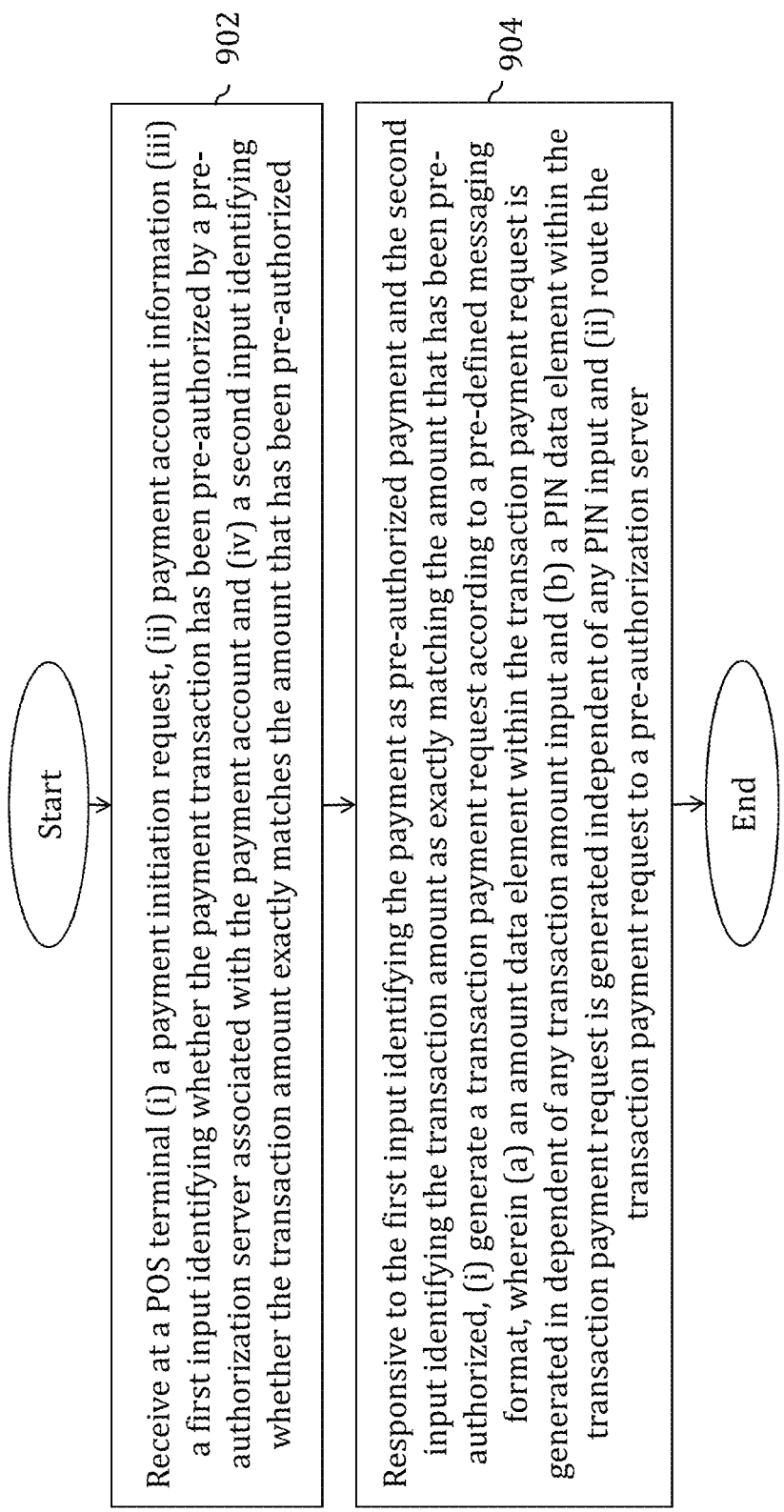
FIG. 9 illustrates a second embodiment of a method of initiating at a POS terminal, a payment transaction that has been pre-authorized.

FIG. 9 illustrates a second embodiment of a method of initiating at a POS terminal, a payment transaction that has been pre-authorized. In the illustrated method embodiment, step 902 comprises receiving at a POS terminal (i) a payment initiation request, (ii) payment account information associated with a payment account presented by a payor for the purpose of executing the pre-authorized transaction, (iii) a first input identifying whether the payment transaction has been pre-authorized by a pre-authorization server associated with the payment account (for example by a pre-authorization server associated with a payment network or with an issuer network associated with the payment account, and (iv) a second input identifying whether the transaction amount exactly matches the transaction amount that has been pre-authorized.

At step 904, responsive to the first input received at the POS terminal identifying the payment as a pre-authorized payment, and the second input identifying the transaction amount as exactly matching the amount that has been pre-authorized, the POS terminal (i) generates a transaction payment request according to a pre-defined messaging format, wherein (a) a transaction amount specific data element within the transaction payment request is populated with data that is independent of any transaction amount input at the POS terminal (for example, comprising a random amount value or a dummy amount value) and (b) a PIN data element within the transaction payment request is populated with data that is independent of any PIN input at the POS terminal (for example, comprising a random PIN value or a dummy PIN value) and (ii) routes the transaction payment request to a transaction authorization server for transaction authorization. In an embodiment, the transaction authorization server of FIG. 9 may be the same server as the pre-authorization server that has previously pre-authorized the payment. In another embodiment, the transaction authorization server of FIG. 9 may be distinct from the pre-authorization server that has previously pre-authorized the payment, and may be in network communication with said pre-authorization server.

By implementing the method of FIG. 9, it will be noted that a user requesting initiation of the pre-authorized payment transaction need not enter either the transaction amount or his PIN for transaction authorization and execution, which results in a faster and more convenient transaction authorization process.

Figure 10:
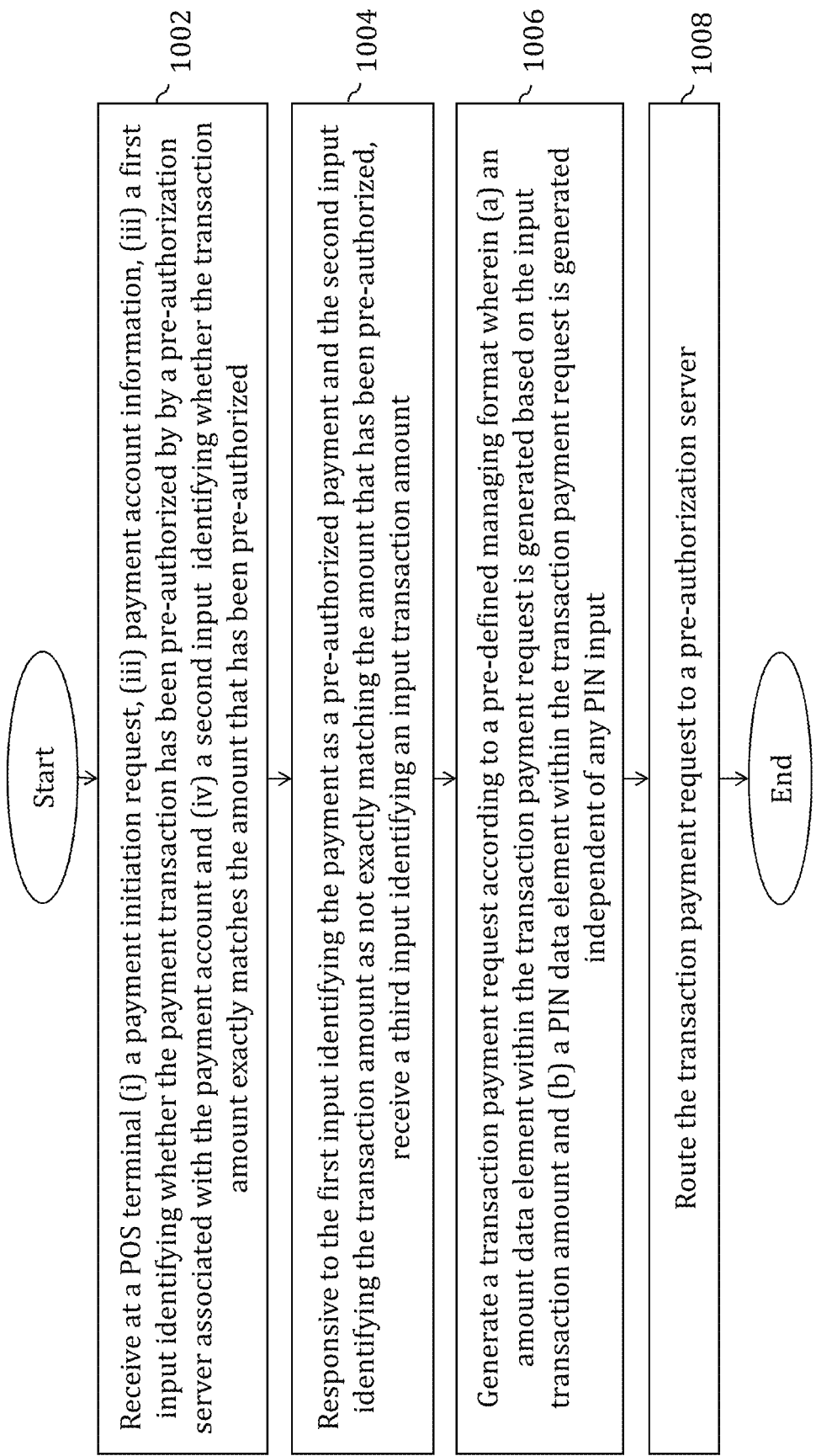
FIG. 10 illustrates a third embodiment of a method of initiating at a POS terminal, a payment transaction that has been pre-authorized.

FIG. 10 illustrates a third embodiment of a method of initiating at a POS terminal, a payment transaction that has been pre-authorized. In the illustrated method embodiment, step 1002 comprises receiving at a POS terminal (i) a payment initiation request, (ii) payment account information associated with a payment account presented by a payor for the purpose of executing the pre-authorized transaction, (iii) a first input identifying whether the payment transaction has been pre-authorized by a pre-authorization server associated with the payment account (for example by a pre-authorization server associated with a payment network or with an issuer network associated with the payment account, and (iv) a second input identifying whether the transaction amount exactly matches the transaction amount that has been pre-authorized.

At step 1004, responsive to the first input received at the POS terminal identifying the payment as a pre-authorized payment, and the second input identifying the transaction amount as not exactly matching the amount that has been pre-authorized, the POS terminal receives a third input identifying a payment transaction amount.

Step 1006 comprises generating a transaction payment request according to a pre-defined messaging format, wherein (a) a transaction amount specific data element within the transaction payment request is populated based on data that is received in the form of the third input at step 1004, and (b) a PIN data element within the transaction payment request is populated with data that is independent of any PIN input at the POS terminal (for example, comprising a random PIN value or a dummy PIN value).

Step 1008 comprises routing the transaction payment request to a transaction authorization server for transaction authorization. In an embodiment, the transaction authorization server of FIG. 10 may be the same server as the pre-authorization server that has previously pre-authorized the payment. In another embodiment, the transaction authorization server of FIG. 10 may be distinct from the pre-authorization server that has previously pre-authorized the payment, and may be in network communication with said pre-authorization server.

By implementing the method of FIG. 10, it will be noted that a user requesting initiation of the pre-authorized payment transaction need not input at least enter her/his PIN for transaction authorization, which results in a faster and more convenient transaction authorization process.

Figure 11:
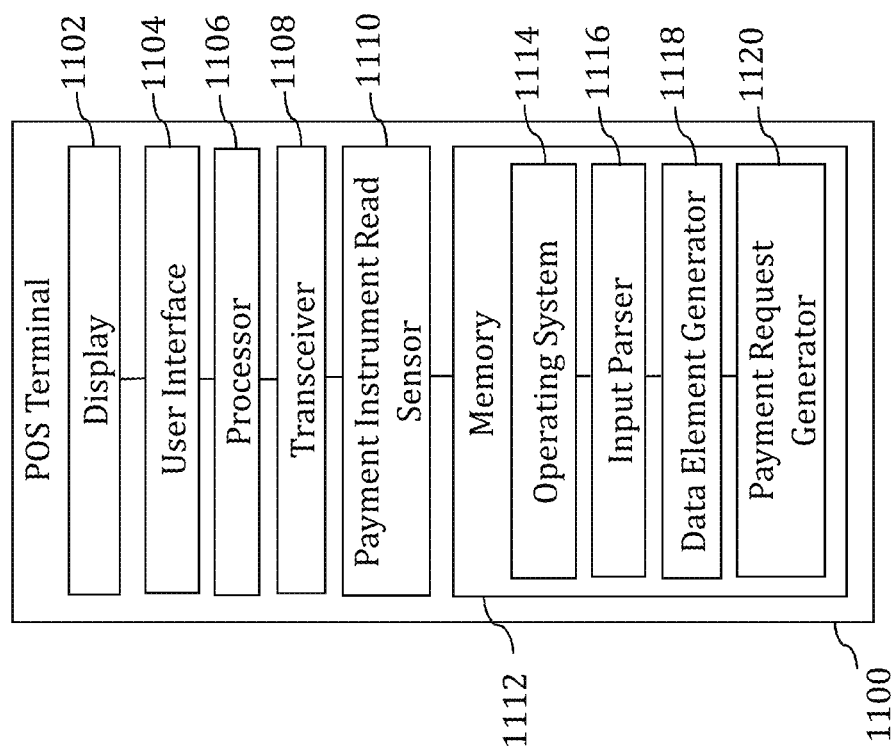
FIG. 11 illustrates an exemplary configuration for a POS terminal in accordance with an embodiment of the invention.

FIG. 11 illustrates an exemplary configuration for a POS terminal 1100 in accordance with an embodiment of the invention.

POS terminal 1100 may comprise any point-of-sale terminal having data processing capabilities and that is configured for network based communication. Said POS terminal 1100 may include a display 1102, a user interface 1104, processor 1106, communication transceiver 1108, payment instrument read sensor 1110 and memory 1112. Payment instrument read sensor 1110 may comprise any one or more sensors configured to read information from a payment instrument or payment token presented by a payor and to extract payment instrument information therefrom, and may include any one or more of a magnetic stripe read sensor, a radio-frequency ID (RFID) sensor, or an optical sensor or optical scanner. Memory 1112 may include transitory memory and/or non-transitory memory.

In an exemplary embodiment, memory 1112 may have stored therewithin, (i) an operating system 1114 configured for managing device hardware and software resources and that provides common services for software programs implemented within POS terminal 1100, (ii) an input parser 1116 configured to parse inputs received at POS terminal 1100 through user interface 1104 and to extract therefrom information relevant to execution of the payment transaction, (iii) a data element generator configured to populate one or more of the PIN data elements and the transaction amount data elements of a payment transaction request message in accordance with the teachings of any one of FIGS. 8 to 10 discussed hereinabove, and (iv) a payment request generator 1120 configured to generation a payment transaction request message based on data received through one or more of payment instrument read sensor 1110, user interface 1104 and input parser 1116 for onward transmission to an authorization server.

Figure 12:
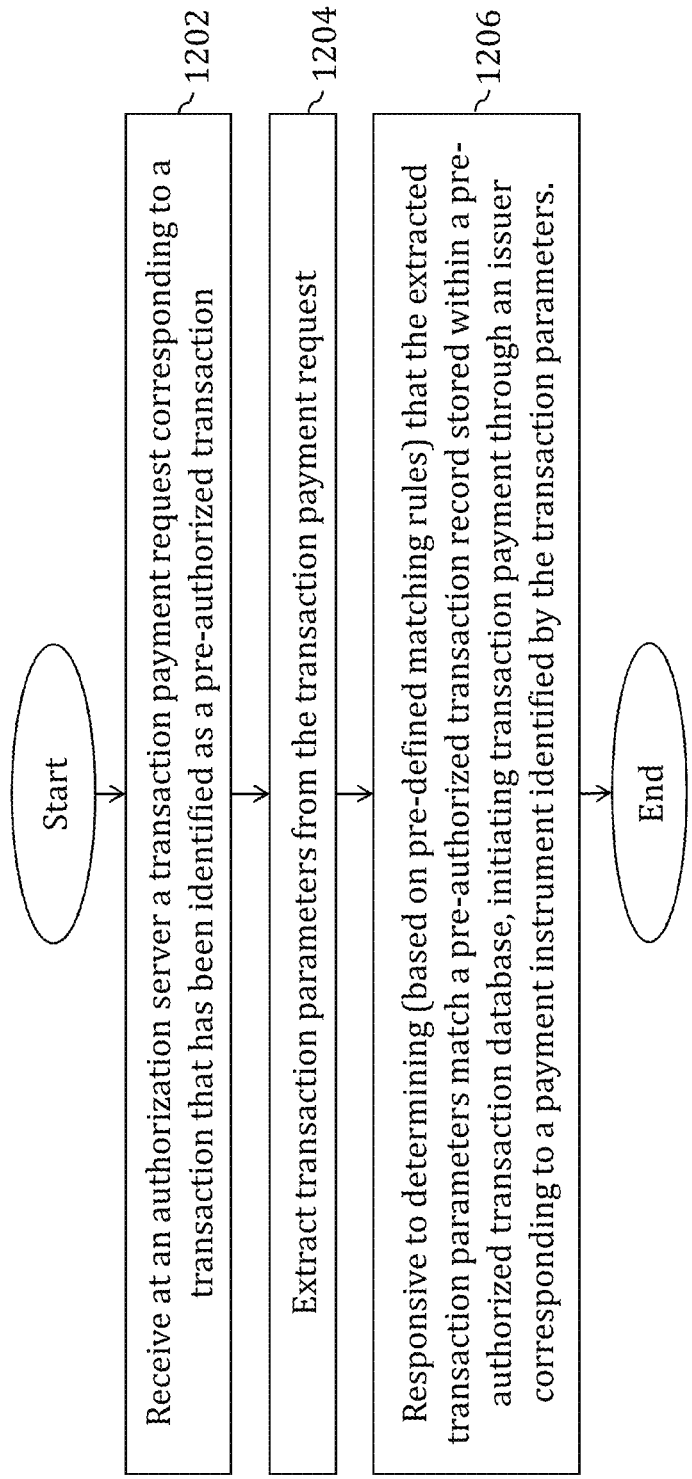
FIG. 12 illustrates a method of implementing payments corresponding to a pre-authorized payment transaction.

FIG. 12 illustrates a method of implementing payment corresponding to a pre-authorized payment transaction—in response to receiving a payment transaction initiation message in accordance with any of the methods of FIGS. 8 to 10.

Step 1202 comprises receiving at a transaction authorization server, a transaction payment request corresponding to a transaction that has been identified as a pre-authorized transaction by a POS terminal and has subsequently been routed to the transaction authorization server (for example, according to any of the methods of FIGS. 8 to 10. In an embodiment, the transaction authorization server may be the same server as the pre-authorization server that has previously pre-authorized the payment. In another embodiment, the transaction authorization server may be distinct from the pre-authorization server that has previously pre-authorized the payment, and may be in network communication with said pre-authorization server.

Step 1204 comprises extracting at the transaction authorization server, transaction parameters from the received transaction payment request. The transaction parameters extracted at step 1204 may thereafter be compared against pre-authorized transaction records stored within a pre-authorized transaction database that stores records of payment transactions that have been pre-authorized, and at step 1206 responsive to determining (based on one or more pre-defined matching rules) that the extracted transaction parameters of step 1204 match a pre-authorized transaction record stored within a pre-authorized transaction database, the transaction authorization server initiates the requested transaction payment through an issuer corresponding to a payment instrument identified by the extracted transaction parameters.

In various embodiment of the invention, at step 1206:

Responsive to the extracted transaction parameters of step 1204 matching a pre-authorized transaction record, the authorization server initiates the requested transaction payment through an issuer corresponding to a payment instrument identified by the extracted transaction parameters, without relying on a data value within the PIN data element of the received transaction payment request, Responsive to the extracted transaction parameters of step 1204 matching a pre-authorized transaction record having a pre-authorization type data field that reflects the pre-authorized transaction as being a pre-authorization of an exact transaction amount, the transaction authorization server initiates the requested transaction payment through an issuer corresponding to a payment instrument identified by the extracted transaction parameters, (i) without relying on data values within the PIN data element of the received transaction payment request and (ii) without relying on a data value within the transaction amount data element of the received transaction payment request and instead relying on a transaction amount data value extracted from the matching pre-authorized transaction record, and/or Responsive to the extracted transaction parameters of step 1204 matching a pre-authorized transaction record having a pre-authorization type data field that reflects the pre-authorized transaction as being a pre-authorization for any transaction amount less than or equal to the pre-authorized transaction value specified in the matching pre-authorized transaction record, the transaction authorization server initiates the requested transaction payment through an issuer corresponding to a payment instrument identified by the extracted transaction parameters, (i) without relying on a data value within the PIN data element of the received transaction payment request and (ii) relying on a data value within the transaction amount data element of the received transaction payment request.

Figure 13:
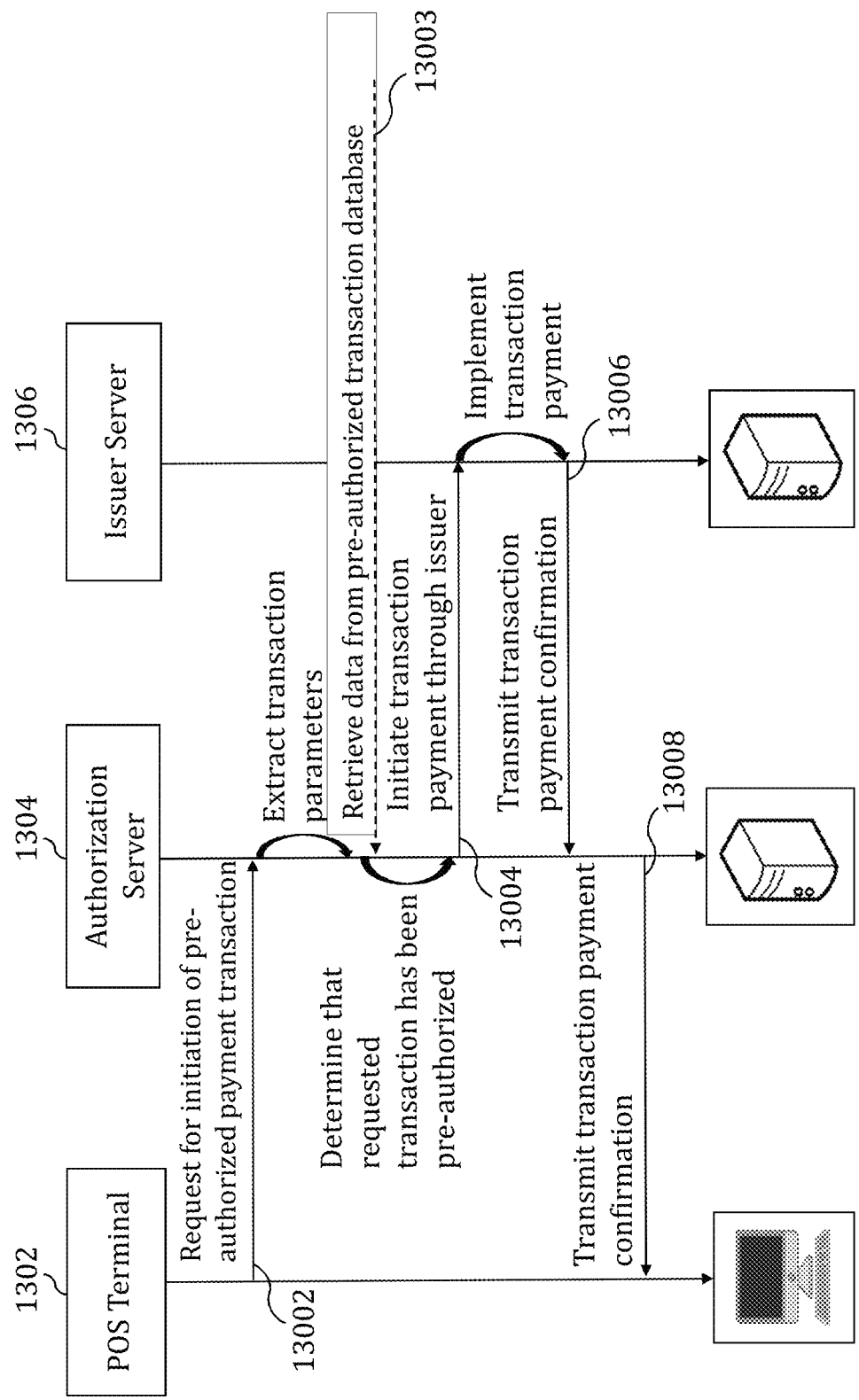
FIG. 13 illustrates communication flow between system entities in implementing the method of FIG. 12.

FIG. 13 is a communication flow diagram illustrating communication flow between system entities involved in pre-authorizing a proposed payment transaction in accordance with the method described above in connection with FIG. 12.

Step 13002 comprises transmitting from POS terminal 1302 to authorization server 1304, a request for initiation of a pre-authorized payment transaction (which request may be initiated in accordance with any of the methods of FIGS. 8 to 10 described hereinabove).

Authorization server 1304 extracts transaction parameters from the received request. At step 13003, authorization server 1304 retrieves data corresponding to one or more pre-authorized transactions from a pre-authorized transaction database, and thereafter determines whether the requested transaction has been pre-authorized—by matching the extracted transaction parameters against the data records retrieved from a database of pre-authorized transactions.

At step 13004, responsive to authorization server 1304 identifying a matching pre-authorized payment transaction, said authorization server 1304 transmits a transaction payment request to issuer server 1306 in accordance with any of the embodiments of method step 1206 that has been discussed above in connection with FIG. 12.

Issuer server 1306 responds to the received transaction payment request by implementing the requested payment transaction, and at step 13006 transmits transaction payment confirmation back to authorization server 1304—which at step 13008 is in turn transmitted by authorization server 1304 onward to POS terminal 1302.

Figure 14:
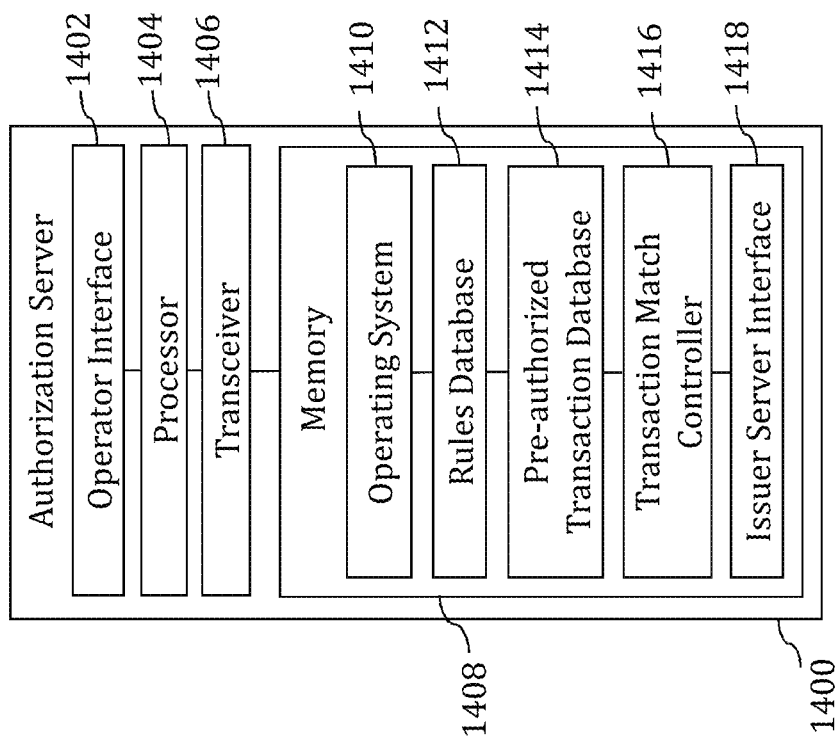
FIG. 14 illustrates an exemplary configuration for an authorization server in accordance with an embodiment of the invention.

FIG. 14 illustrates an exemplary configuration for an authorization server 1400 in accordance with an embodiment of the invention.

Authorization server 1400 may comprise any data server having data processing capabilities and that is configured for network based communication. Said authorization server 1400 may include an operator interface 1402, processor 1404, communication transceiver 1406 and memory 1408. Memory 1408 may include transitory memory and/or non-transitory memory.

In an exemplary embodiment, memory 1408 may have stored therewithin, (i) an operating system 1410 configured for managing device hardware and software resources and that provides common services for software programs implemented within authorization server 1400, (ii) a rules database 1412 comprising one or more rules that the authorization server 1400 may use for the purposes of transaction authorization, (iii) a pre-authorized transaction database 1414 (which in certain embodiments may alternatively be located remote to the authorization server but in network communication therewith)—which database may store data records corresponding to pre-authorized payment transactions (for example, payment transactions that have been pre-authorized by the pre-authorization server in accordance with the method discussed in connection with FIG. 5), (iv) a transaction match controller 1416 configured to compare and match data parameters extracted from a payment transaction request message received from a POS terminal and one or more data records extracted from the pre-authorized transaction database 1414, and (v) an issuer server interface 1418 configured to enable authorization server 1400 to communicate with an issuer network for the purposes of requesting implementation of a requested pre-authorized payment transaction.

Figure 15:
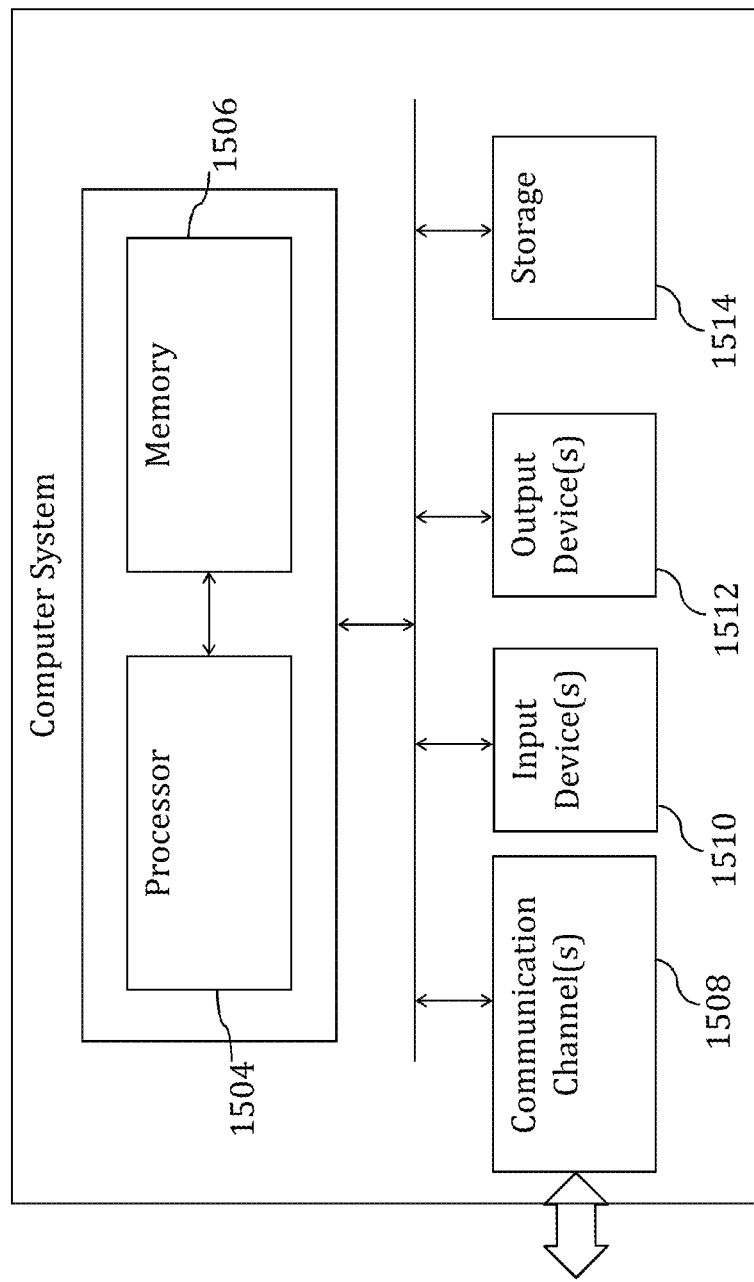
FIG. 15 illustrates an exemplary computer system according to which various embodiments of the present invention may be implemented.

FIG. 15 illustrates an exemplary computer system 1500 according to which various embodiments of the present invention may be implemented.

System 1500 includes computer system 1502 which in turn comprises one or more processors 1504 and at least one memory 1506. Processor 1504 is configured to execute program instructions—and may be a real processor or a virtual processor. It will be understood that computer system 1502 does not suggest any limitation as to scope of use or functionality of described embodiments. The computer system 1502 may include, but is not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 1502 in accordance with the present invention may include one or more servers, desktops, laptops, tablets, smart phones, mobile phones, mobile communication devices, tablets, phablets and personal digital assistants. In an embodiment of the present invention, the memory 1506 may store software for implementing various embodiments of the present invention. The computer system 1502 may have additional components. For example, the computer system 1502 may include one or more communication channels 1508, one or more input devices 1510, one or more output devices 1512, and storage 1514. An interconnection mechanism (not shown) such as a bus, controller, or network, interconnects the components of the computer system 1502. In various embodiments of the present invention, operating system software (not shown) provides an operating environment for various software(s) executing in the computer system 1502 using a processor 1504, and manages different functionalities of the components of the computer system 1502.

The communication channel(s) 1508 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 1510 may include, but is not limited to, a touch screen, a keyboard, mouse, pen, joystick, trackball, a voice device, a scanning device, or any another device that is capable of providing input to the computer system 1502. In an embodiment of the present invention, the input device(s) 1510 may be a sound card or similar device that accepts audio input in analog or digital form. The output device(s) 1512 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 1502.

The storage 1514 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1502. In various embodiments of the present invention, the storage 1514 may contain program instructions for implementing any of the described embodiments.

In an embodiment of the present invention, the computer system 1502 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1502. The method described herein is typically implemented as a computer program product, comprising a set of program instructions that is executed by the computer system 1502 or any other similar device. The set of program instructions may be a series of computer readable codes stored on a tangible medium, such as a computer readable storage medium (storage 1514), for example, diskette, CD-ROM, ROM, flash drives or hard disk, or transmittable to the computer system 1502, via a modem or other interface device, over either a tangible medium, including but not limited to optical or analogue communications channel(s) 1508. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

Based on the above, it would be apparent that the present invention offers significant advantages—including providing for an optimized payor user-experience at the POS terminal, since the payor no longer requires to input a PIN, and optionally may not require to input a transaction amount—and also resulting in significant reductions in time required for completing a transaction at a POS terminal.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment that is specifically contemplated, the invention is intended to be practiced in the absence of any one or more element which are not specifically disclosed herein.

The invention claimed is:

1. A method for implementing a payment transaction that has been pre-authorized and wherein the pre-authorization includes storing a data record comprising transaction parameters corresponding to the payment transaction in a pre-authorized transaction database, the method comprising:
   at a point-of-sale (POS) terminal:
      receiving a payment initiation request from a payment card;
      receiving, from the payment card, payment account information associated with a payment account associated with a payor;
      receiving, from a user, a first input identifying the payment transaction as a payment transaction that has been pre-authorized by a pre-authorization server associated with the payment account, wherein the pre-authorization is based on payment transaction pre-authorization rules, payor information corresponding to the payor, merchant information corresponding to a merchant executing the POS terminal, and transaction information corresponding to the payment transaction;
      responsive to receiving the payment account information from the payment card and the first input identifying the payment transaction as a payment transaction that has been pre-authorized, generating a transaction payment request based on a pre-defined request message format, wherein generating includes populating i) a personal identification number (PIN) data element, independent of any PIN value input at the POS terminal, and ii) a transaction amount of the transaction payment request within the transaction payment request; and
      routing, independent of a value of the populated PIN data element, the generated transaction payment request to a transaction authorization server that is communicably coupled to the pre-authorized transaction database,
   the transaction parameters being extracted from the generated transaction payment request, the transaction parameters including a pre-authorized transaction amount,
   the extracted transaction parameters being determined to match a retrieved pre-authorized transaction record having a pre-authorization type data field that reflects a pre-authorized transaction as a pre-authorization for any transaction amount less than or equal to a transaction value recorded within the matching pre-authorized transaction record, and the transaction payment request being initiated responsive to determining that the extracted transaction parameters match the retrieved pre-authorized transaction record.

2. The method as claimed in claim 1, further comprising:

receiving, at the POS terminal from the user, a second input identifying the payment transaction as a payment transaction that has been pre-authorized by the pre-authorization server associated with the payment account for any transaction value that is less than or equal to a specified transaction value;

responsive to receiving, at the POS terminal, the second input identifying the payment transaction as a payment transaction that has been pre-authorized for any transaction value that is less than or equal to a specified transaction value, generating, at the POS terminal, the transaction payment request based on the pre-defined request message format; and receiving, at the POS terminal from the user, a third input that provides a transaction amount value, wherein the transaction amount within the transaction payment request is populated with the transaction amount value.

3. The method as claimed in claim 1, wherein the payor information includes one or more of a payor name, a payor identifier, payment card information, and payor authorization information, wherein the transaction information includes one or more of an exact transaction value, a maximum permissible transaction value, and a time window within which the payment transaction is expected to be initiated, and the method further comprising:

receiving, at the POS terminal within the time window, a second input identifying the payment transaction as a payment transaction that has been pre-authorized by the pre-authorization server associated with the payment account less than or equal to the maximum permissible transaction value, and initiating the transaction payment request based on the second input being received.

4. The method as claimed in claim 3, wherein either or both of the pre-authorization server and the transaction authorization server are located within a payment network or an issuer network associated with the payment account.

5. The method as claimed in claim 1, further comprising, at the transaction authorization server:

comparing the extracted transaction parameters against pre-authorized transaction records retrieved from the pre-authorized transaction database; and responsive to determining that the extracted transaction parameters match the retrieved pre-authorized transaction record, initiating a transaction payment based on the extracted transaction parameters.

6. The method as claimed in claim 5, wherein the transaction authorization server is configured to initiate the transaction payment at least by relying on the transaction amount extracted from the matching pre-authorized transaction record.

7. The method as claimed in claim 5, wherein the transaction authorization server is configured such that responsive to the extracted transaction parameters matching a pre-authorized transaction record having a pre-authorization type data field that reflects a pre-authorized transaction as a pre-authorization of an exact transaction amount, the transaction payment is initiated by the transaction authorization server without relying on either of (i) a data value within the PIN data element of the transaction payment request received from the POS terminal, and (ii) a data value within the transaction amount of the transaction payment request received from the POS terminal.

8. The method as claimed in claim 5, wherein the transaction payment is initiated by the transaction authorization server without relying on a data value within the PIN data element of the transaction payment request received from the POS terminal, and by relying on a data value within the transaction amount of the transaction payment request received from the POS terminal.

9. A system for implementing a payment transaction that has been pre-authorized and wherein the pre-authorization includes storing a data record comprising transaction parameters corresponding to the payment transaction in a pre-authorized transaction database, the system comprising:

a processor implemented point-of-sale (POS) terminal, configured to implement operations of:

receiving a payment initiation request from a payment card;

receiving, from the payment card, payment account information associated with a payment account associated with a payor;

receiving, from a user, a first input identifying the payment transaction as a payment transaction that has been pre-authorized by a pre-authorization server associated with the payment account, wherein the pre-authorization is based on payment transaction pre-authorization rules, payor information corresponding to the payor, merchant information corresponding to a merchant executing the POS terminal, and transaction information corresponding to the payment transaction;

responsive to receiving the payment account information from the payment card and the first input identifying the payment transaction as a payment transaction that has been pre-authorized, generating a transaction payment request based on a pre-defined request message format, wherein generating includes populating i) a personal identification number (PIN) data element, independent of any PIN value input at the POS terminal, and ii) a transaction amount of the transaction payment request within the transaction payment request; and routing, independent of a value of the populated PIN data element, the generated transaction payment request to a transaction authorization server that is communicably coupled to the pre-authorized transaction database, the transaction parameters being extracted from the generated transaction payment request, the transaction parameters including a pre-authorized transaction amount, the extracted transaction parameters being determined to match a retrieved pre-authorized transaction record having a pre-authorization type data field that reflects a pre-authorized transaction as a pre-authorization for any transaction amount less than or equal to a transaction value recorded within the matching pre-authorized transaction record, and the transaction payment request being initiated responsive to determining that the extracted transaction parameters match the retrieved pre-authorized transaction record.

10. The system as claimed in claim 9, wherein the POS terminal is configured to:

receive, from the user, a second input identifying the payment transaction as a payment transaction that has been pre-authorized by the pre-authorization server associated with the payment account for any transaction value that is less than or equal to a specified transaction value;

responsive to receiving, at the POS terminal, the second input identifying the payment transaction as a payment transaction that has been pre-authorized for any transaction value that is less than or equal to a specified transaction value, generate the transaction payment request based on the pre-defined request message format; and receive a third input from the user that provides a transaction amount value, wherein the transaction amount within the transaction payment request is populated with the transaction amount value.

11. The system as claimed in claim 9,
wherein the payor information includes one or more of a payor name, a payor identifier, payment card information, and payor authorization information, and
wherein the transaction information includes one or more of an exact transaction value, a maximum permissible transaction value, and a time window within which the payment transaction is expected to be initiated.

12. The system as claimed in claim 11, wherein either or both of the pre-authorization server and the transaction authorization server are located within a payment network or an issuer network associated with the payment account.

13. The system as claimed in claim 9, further comprising the transaction authorization server configured to:
compare the extracted transaction parameters against pre-authorized transaction records retrieved from the pre-authorized transaction database; and
responsive to determining that the extracted transaction parameters match a retrieved pre-authorized transaction record, initiate a transaction payment based on the extracted transaction parameters.

14. The system as claimed in claim 13, wherein the transaction authorization server is configured to initiate the transaction payment at least by relying on the transaction amount extracted from the matching pre-authorized transaction record.

15. The system as claimed in claim 13, wherein the transaction authorization server is configured such that responsive to the extracted transaction parameters matching a pre-authorized transaction record having a pre-authorization type data field that reflects a pre-authorized transaction as a pre-authorization of an exact transaction amount, the transaction payment is initiated by the transaction authorization server without relying on either of (i) a data value within the PIN data element of the transaction payment request received from the POS terminal, and (ii) a data value within the transaction amount of the transaction payment request received from the POS terminal.

16. The system as claimed in claim 13, wherein the transaction payment is initiated by the transaction authorization server without relying on a data value within the PIN data element of the transaction payment request received from the POS terminal, and by relying on a data value within the transaction amount of the transaction payment request received from the POS terminal.

17. The method as claimed in claim 1, wherein the populated PIN data element is a random PIN value or a dummy PIN value.

18. A system for pre-authorizing and executing a payment transaction, the system comprising:
a communication interface;
a processor; and
a memory storing instructions that, when executed by the processor, cause the processor to:
receive, from a client terminal, a request to initiate pre-authorization of a payment transaction,
receive, from the client terminal, payor information corresponding to a payor and including payment account information associated with a payment account of the payor, merchant information corresponding to a merchant executing the client terminal, and transaction information corresponding to the payment transaction,
generate an approval decision for the payment transaction,
generate a data record comprising transaction parameters corresponding to the payment transaction,
store the generated data record in a pre-authorized transaction database implemented on the memory,
receive a transaction payment request based on a pre-defined request message format, the transaction payment request includes i) a personal identification number (PIN) data element, independent of any PIN value input at the client terminal, and ii) a transaction amount of the transaction payment request within the transaction payment request, wherein the transaction payment request is received upon a request to initiate the pre-authorized payment transaction at the client terminal, the payment account information being received at the client terminal, and a first input identifying the payment transaction as a payment transaction that has been pre-authorized at the client terminal,
extract transaction parameters from the received transaction payment request, the extracted transaction parameters including a pre-authorized transaction amount,
determine the extracted transaction parameters match a retrieved pre-authorized transaction record having a pre-authorization type data field that reflects a pre-authorized transaction as a pre-authorization for any transaction amount less than or equal to a transaction value recorded within the matching pre-authorized transaction record,
initiate, responsive to determining the extracted transaction parameters match the retrieved pre-authorized transaction record, the transaction payment request,
receive, from an issuer server, confirmation of the payment transaction based on the stored data record, and
transmit, to the client terminal, the confirmation of the payment transaction for execution of the payment transaction.

19. The system of claim 18, wherein the transaction parameters include one or more of the payment account information, a payor ID of the payor, the merchant information, the transaction information, and payment instrument instruction.

20. The system of claim 18, wherein the memory further stores instructions that, when executed by the processor, further cause the processor to:
retrieve data corresponding to the pre-authorized transaction stored in the pre-authorized transaction database,
match the extracted transaction parameters to the transaction parameters of the pre-authorized transaction, and
responsive to matching the extracted transaction parameters to the transaction parameters of the pre-authorized transaction, transmit a request to the issuer server to execute the transaction payment request.

\* \* \* \* \*